United States Patent
Wanner et al.

(10) Patent No.: US 8,338,743 B2
(45) Date of Patent: Dec. 25, 2012

(54) METHOD AND DEVICE FOR CONTROLLING ROBOTS FOR WELDING WORKPIECES

(75) Inventors: Martin Christoph Wanner, Nienhagen (DE); Alexander Zych, Rostock (DE); Uwe Pfletscher, Rethwisch (DE)

(73) Assignees: Fraunhofer-Gesellschaft zur Foerderung der Angewandten Forschung E.V., Munich (DE); Universitaet Rostock, Rostock (DE)

( * ) Notice: Subject to any disclaimer, the term of this patent is extended or adjusted under 35 U.S.C. 154(b) by 537 days.

(21) Appl. No.: 12/449,595

(22) PCT Filed: Feb. 19, 2008

(86) PCT No.: PCT/EP2008/001618
§ 371 (c)(1),
(2), (4) Date: Feb. 19, 2010

(87) PCT Pub. No.: WO2008/101737
PCT Pub. Date: Aug. 28, 2008

(65) Prior Publication Data
US 2010/0152870 A1   Jun. 17, 2010

(30) Foreign Application Priority Data
Feb. 19, 2007 (DE) .................. 10 2007 008 598

(51) Int. Cl.
*B23K 26/00* (2006.01)
(52) U.S. Cl. .................... 219/121.64; 901/42
(58) Field of Classification Search ............ 219/121.63, 219/121.64; 901/42
See application file for complete search history.

(56) References Cited

U.S. PATENT DOCUMENTS

| | | | |
|---|---|---|---|
| 5,579,444 A | 11/1996 | Dalziel et al. | |
| 5,991,437 A | 11/1999 | Migdal et al. | |
| 5,999,642 A | 12/1999 | Gilliland | |
| 6,226,395 B1 | 5/2001 | Gilliland | |
| 6,570,426 B2 | 5/2003 | Nakashimo | |
| 7,034,249 B2 | 4/2006 | Gustafsson et al. | |
| 7,272,524 B2 | 9/2007 | Brogaerdh et al. | |
| 7,376,488 B2 * | 5/2008 | Watanabe et al. | 700/264 |
| 2004/0158965 A1 * | 8/2004 | Savoy | 29/407.1 |
| 2006/0181236 A1 * | 8/2006 | Brogardh | 318/568.1 |
| 2010/0021051 A1 * | 1/2010 | Melikian et al. | 382/153 |

FOREIGN PATENT DOCUMENTS
DE   41 15 846 A1   11/1992
(Continued)

OTHER PUBLICATIONS

Stark, "Computer-aided robot control sequence generation method", Apr. 22 1999, machine translation attached.* Machleidt, T. et al; "Extraktion und Verarbeitung von 3-D Geometriedaten mittels Bildsensorik fuer unterschiedliche Messvolumina"; May 26, 2003; XP002481313.

*Primary Examiner* — Benjamin Sandvik
(74) *Attorney, Agent, or Firm* — Marshall & Melhorn, LLC

(57) ABSTRACT

The invention relates to a method for controlling robots for welding three-dimensional workpieces, comprising the following steps: positioning and tacking profiles to a plate in order to form the workpiece to be welded, depicting the workpiece by means of a three-dimensional imaging system in the form of three-dimensional pixels, determining the geometric data of the plate and profiles, including the allocation of cutouts and final cutting shapes from the three-dimensional pixels, determining the weld seam data from the geometric data while considering the profile placement lines and the contact lines of profiles, allocating the weld seam data to parameterizable specifications for the weld plan into stored predefined movement patterns of the robot, and into commands for the control of the welding process.

22 Claims, 2 Drawing Sheets

FOREIGN PATENT DOCUMENTS

| | | |
|---|---|---|
| DE | 198 29 661 A1 | 4/1999 |
| DE | 101 15 149 A1 | 10/2002 |
| DE | 60 2004 005 776 T2 | 8/2007 |
| EP | 1 361 414 A1 | 11/2003 |
| EP | 1 188 510 B1 | 12/2008 |
| WO | WO 2004/071717 A1 | 8/2004 |

* cited by examiner

METHOD AND DEVICE FOR CONTROLLING ROBOTS FOR WELDING WORKPIECES

BACKGROUND OF THE INVENTION

The invention relates to a method for controlling robots for welding three-dimensional workpieces.

In shipbuilding, micropanels are used which comprise steel plates and reinforcing profiles welded thereon. In the initial situation, these reinforcing profiles of different types are tack-welded onto the steel plates and subsequently welded by bent arm robots or portal welding units. The profiles are distinguished by different profile shapes, dimensions and end cut edges, the arrangement of the profiles on the plates is possible in any way. However particularly in the case of small piece numbers as is the case with micropanels in shipbuilding, the movement programming of the welding robots for the track welding represents a disproportionately high complexity in the entire, otherwise automated manufacturing process.

At present, almost all programming methods for the welding of three-dimensional workpieces in shipbuilding are based on the availability and subsequent conversion of the respective CAD data. In addition to interface problems and the problems of compatibility of different CAD programmes and their output data files for the normally used CAM module, these programming methods are associated with a highly restricted possibility of reacting to temporarily changing constructional or technological features of the component to be welded. If a panel changes temporarily in that profiles are missing, have constructional additions or the arrangement thereof is changed, nevertheless the original, no longer relevant robot programme is run. A further problem in the previous modus operandi is the necessity for orientation of the workpiece according to the robot programme or the displacement and reorientation of the programme corresponding to the position of the component.

In the state of the art, a further method for controlling and programming welding robots is known (EP 1 188 510 A2), in which a two-dimensional photo of the constructional template with the workpieces distributed thereon is produced by means of a camera. From the image data, the programme recognises profile lines in plan view by means of contrast differences. The limitation of this method resides in the fact that neither the profile heights, i.e. the length of vertical seams, nor cutouts and different start and end cut edges of the profiles can be recognised. In addition, in order to initiate the programme, relatively comprehensive interactive inputs from the operator are required, which describe in particular the starting and end conditions of the weld seams.

BRIEF SUMMARY OF THE INVENTION

The object underlying the invention is to produce a method for controlling robots for welding three-dimensional workpieces, with which the provision of CAD data of the workpiece to be welded is not required, which automatically determines welding seams both in the horizontal and vertical direction and which allows a flexible reaction to temporarily changing constructional or technological features of the workpiece to be welded.

This object is achieved according to the invention by the features of the main claim.

Advantageous developments and improvements are possible as a result of the measures indicated in the sub-claims.

As a result of the fact that the workpiece to be welded which is configured as a plate with profiles tack-welded thereon is imaged by means of a three-dimensional image detection system in the form of three-dimensional pixels and the geometrical data of the plate and of the profiles are determined from the three-dimensional pixels, the weld seam data are determined from the geometrical data taking into account the profile placement lines and the contact lines of profiles and the weld seam data are assigned to stored, predefined movement patterns of the robot and commands for controlling the welding process, a programme which is independent of the CAD data of the workpiece can be generated as a method for controlling the robots. This type of programme generation which is immediate in time and location circumvents the possibilities of errors which can occur as a result of technical or technological changes in the time between offline programme generation and processing of the welding task.

In the case of the method according to the invention, the image detection system directly delivers the point clouds (three-dimensional pixels) required for further processing of a measured object. These are matrices with n lines, corresponding to the number of measuring points, and three columns, corresponding to the three dimensions of space. Directly on the basis of the three-dimensional point cloud, a 3D geometrical data processing is effected, i.e. segmentation (separation of the points of the object from the background, separation of the points of the base plate from points of the profiles, separation of the points of the profiles from each other), feature extraction (establishment of profile courses from the segmented point cloud), examination of the partial point clouds of the individual profiles according to properties of the profiles, such as start and end cut edges, burnt-out sections or undercuts, height or the like. As a result of the 3D image detection and 3D image processing, it is possible to avoid interactive user inputs for generation of the welding programmes or coupling to constructional data which are required in 2D measuring technology. Hence, a system which operates according to the method according to the invention can be regarded as fully automated.

Further advantages can be mentioned with respect to: programme generation immediately before operation; programme generation with reference to presently occurring component geometries; any component positioning and orientation, consideration of all spatial coordinates, as a result of which approachability and freedom from collision can also be ensured at the same time. The method can be adapted easily to existing portal robot systems and, as a result of the method according to the invention, great flexibility in production is achieved.

Any sensor arrangement which is able to deliver the coordinates in space for any detected object point can be used for the image detection. The higher the resolution of the data, i.e. the point density, the better is the recognition of details. It is advantageous to detect the image of the workpiece by means of a 3D laser scanner which, from several individual pictures, delivers a spatial digital model of the workpiece to be welded. The detection of the three-dimensional image coordinates is also possible with at least one pattern projector and at least one camera with assigned evaluation.

BRIEF DESCRIPTION OF THE DRAWINGS

An embodiment of the method according to the invention is explained in more detail in the subsequent description with reference to the accompanying drawing. There are shown FIG. 1 a perspective view of a workpiece to be welded which is configured as a micropanel, FIG. 2 a view of a further workpiece, and FIG. 3 an arrangement of pass marks for calibration of the laser scanner used in the embodiment.

DETAILED DESCRIPTION OF THE INVENTION

Figure 1:
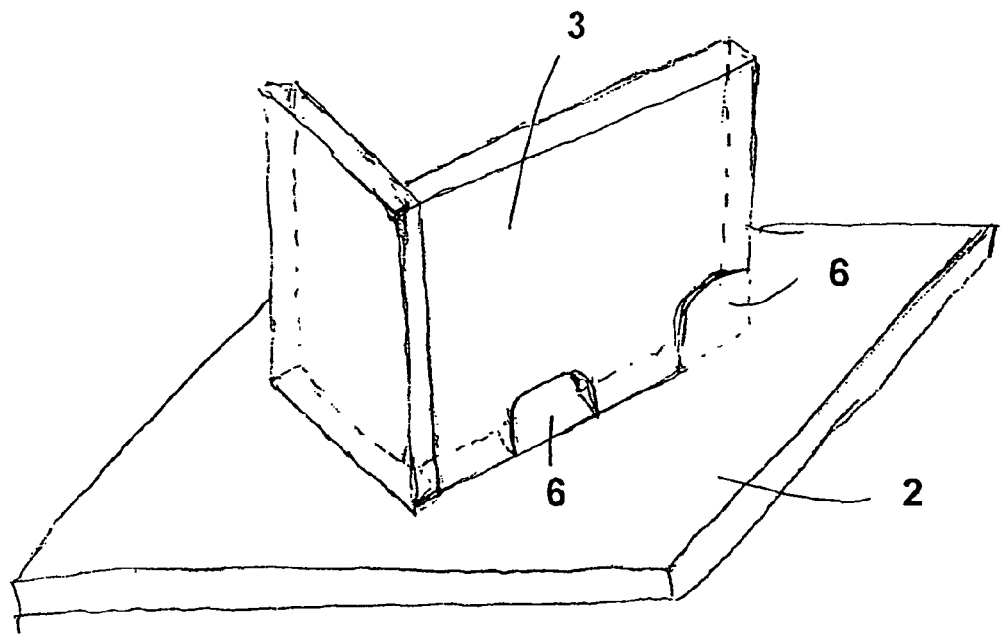
Figure 2:
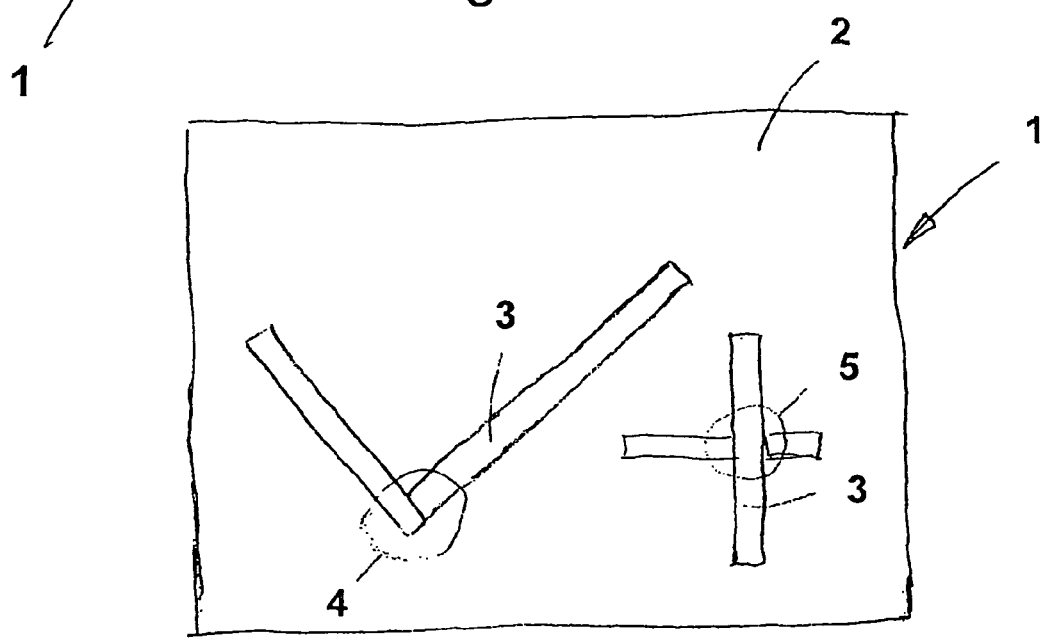

There are represented in a simplified manner in FIG. 1 and FIG. 2 two micropanels 1 which normally comprise steel plates 2 which are typical for shipbuilding and have steel profiles 3 tack-welded thereon, the surface area of which does not substantially exceed 3 m×16 m. The illustrated micropanels are only configured schematically, normally the steel plates 2 are provided with burnt-out sections 6 and undercuts and the profiles 3 are also present in a larger number.

These micropanels 1, i.e. the profiles 3 and the steel plate 2, are welded by means of a robot, for example a bent arm robot, the welding being intended to be controlled in an automated manner. For this purpose, both the welding lines in the x-y plane must be determined between profiles 3 and steel plate 2 and in the z-direction between the profiles 3.

The positioned micropanel 1 is then scanned in the present embodiment with a 3D laser scanner, a sufficiently large number of partial photos being resolved, according to the size of the working area to be detected, independently of the recording field of the scanner from various angles of incidence. By means of the known geometrical relationships of the positions and orientations of the individual images amongst each other, a three-dimensional image of the working space with the panel 1 to be processed is generated from these individual photos. Hence the entire image is present as pixels in a three-dimensional coordinate system.

From the image data of the photographed scene, the geometrical data of the workpieces or of the micropanel 1 in the working space are then determined. For this purpose, the data relating to the background are separated from the real workpiece data, generally all measuring points above the plane of the constructional support of the work table being workpiece points and the points on or below this plane being background points. Subsequently, the normal vector of the plate 2 is determined and the coordinates are transformed into a workpiece coordinate system with the help of this vector, the x-y plane of said workpiece coordinate system corresponding to the plate plane and the z-axis thereof coinciding with the specific normal vector.

The courses of the profiles 3 on the plate surface are crucial for the position of the welding seams. In order to determine these courses, the profile data which produce the profile areas which penetrate the surface of the plate 2 must be filtered out. These penetration lines, e.g. those in which profile planes and panel plane penetrate, correspond to the profile courses.

In order to determine the surface area of the profiles, the pixels of the surface of the plate 2 are separated from the pixels of the surface of the profiles 3. Since the profile points are all located unequivocally above the level of the plate 2, the value of the z-coordinate can be used to differentiate and assign the points. By observing different height layers, the pixels can be divided unequivocally into profile points and panel- or plate points by separating the coordinates above the panel plane.

In FIGS. 1 and 2, a simple form of a panel 1 is represented, however the forms can be very varied and complicated with recesses and undercuts. In order that a clear delimitation of large structure and background can be undertaken, the contour of the panel or of the plate 2 is determined. In order to identify the edge points unequivocally, the panel points separated in advance from the rest are combined so that the z-coordinates can no longer be differentiated from each other. The thus determined partial point cloud is then examined for edge points by way of lines and columns.

In order to determine the placement lines of the profiles 3 which are the stretches on which the profiles 3 are tack-welded onto the plate 2 by their standing surfaces, it is necessary to determine coherent structures within the corresponding pixels of the profiles in order to be able to separate the courses of different straight lines from each other. For this purpose, the spacing between the points is taken into account, the profile point cloud being examined by way of lines and columns similarly to the search for the contour in order to determine the structures or structural fragments, from which then the profile courses are combined by classification.

In order that unequivocal information relating to the precise course of the subsequent weld seams can be obtained, the intersection points 4, 5 (see FIG. 2) of the profiles 3 with each other and also the inner and outer sides thereof must be determined since the intersecting edges on which the ascending seams connecting the profiles 3 to each other extend are determined by this. The intersection points must be differentiated into one-sided 4 and two-sided 5. If two profile elements are in contact, the intersection point is one-sided and two vertical weld seams are required, if two profile elements intersect each other, the point is two-sided and four vertical weld seams are required.

The intersecting straight lines, which correspond to the profile placement lines or the extension thereof up to intersection of the two straight lines, are the geometrical basis for the course of the weld seams which are disposed to the right and left of the interpolated straight lines of the recognised profiles. In order to find these, the material thickness of the profile is taken into account.

As starting and end points of the intersecting straight lines, the starting and end points of the relevant profiles can be used, it being important that the found intersection points of the profiles are taken into account as an interruption to the line continuation. At these points, the vertical seams for welding the profiles to each other begin. The starting and end point of the vertical seams is produced from the level of the panel plane and the height of the recognised profiles.

After the coordinates of the weld seams which are horizontal seams and ascending seams have been found, these are delivered to the control unit of the welding robot. This control unit allocates to the robot assigned, parameterisable movement patterns, so-called macros, the respective weld seams being assigned to the stored macros with the help of data delivered as parameters, i.e. the macros are adapted by means of the parameters, starting and end coordinates, profile height and material thickness inter alia to the conditions of the concrete weld seam. The specific commands for controlling the welding process, such as switching the gas supply on and off, igniting the arc, activating the seam tracking, end crater filling and back burning of the wire end are already stored in the macros.

For additional functions, such as e.g. collision checks, height and material thickness of the individual profiles 3 are delivered to the control unit and taken into account during welding.

The operating sequence of the weld seams (welding plan) is predetermined automatically by means of various, already stored, adaptable criteria but can be changed by the user with interactive programme input.

As already explained above, the device according to the invention is provided with an image detection system which comprises an image detection module which receives the data of the image detection sensor and combines the point clouds of the individual images to form a total image of the working space. A geometrical detection module determines, as explained above, the geometrical data of the workpieces in the working space from the image data of the recorded scene and the necessary weld seam data and a control device containing a control algorithm implements the control/regulation of the welding process by using the control unit of the robot.

In addition, a calibration module is provided, which correlates the coordinate systems of the robot, of the image detection sensor and of the constructional template or of the workpiece. It includes in addition the exact positions and orientations of the individual images for joining together to form a uniform image composite. A calibration algorithm which assists interactive measurement is stored for this group of data. Furthermore, it comprises parameters and settings for optimising the geometrical recognition.

A calibration method of a three-dimensional image detection system which is configured as a 3D laser scanner is described subsequently, said system being possible however also for other types of image detection. In the case of this calibration method, no intervention into the laser scanner per se is undertaken and the calibration itself is implemented during or after installation of the unit or routinely in the case of any measuring inaccuracies occurring.

Figure 3:
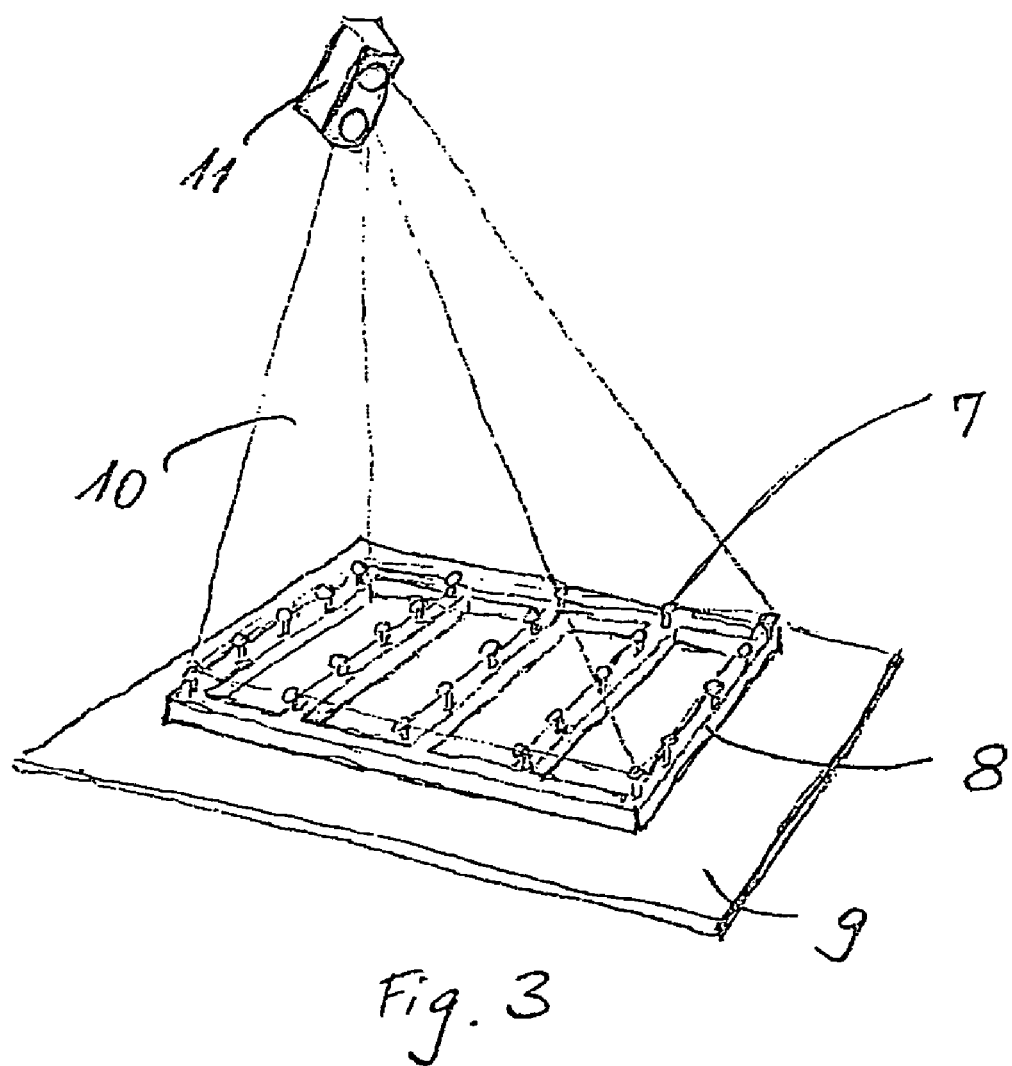

For calibration, reference balls 7 on a frame 8 which serves as a mounting are disposed, in the embodiment, uniformly at spacings from each other, said frame being disposed in turn on the work table 9 of the workpiece to be welded. The image detection region 10 of the laser scanner 11 is prescribed by the frame 8 or by the balls 7 situated externally thereon. The reference values of the centres of the reference balls 7 are known in any coordinate system, i.e. in a coordinate system prescribed by the arrangement according to FIG. 3. Furthermore, the ball diameter is known. A central ball is disposed approximately in the centre of the image detection region, i.e. in the centre of the coordinate system of the scanner. Subsequently, the reference balls are photographed by the scanner and a point cloud of the reference balls in the flat working region to be calibrated are produced.

The actual values of the ball centres are determined from the point cloud in that this point cloud is divided into individual partial point clouds which contain respectively the surface points of the individual balls (segmentation). Subsequently, the ball centres are determined from the surface points of the individual balls with the help of the method of the smallest error squares.

The scanner 11 has a matrix as image sensor, comprising a large number of pixels, which in the following is termed scanner matrix. In this matrix, the line and column indices associated with the determined ball centres are determined and designated by $z\_i$, $s\_i$, $i$ being the number of the respective ball. Then the coordinate system of the reference values of the centres, termed reference data, is orientated to the coordinate system of the actual values, i.e. of the ball centres which were obtained from the point cloud photographed with the scanner, termed actual data. This orientation takes place via the planes spanned respectively by the ball centres, i.e. the plane of the actual data of the ball centres is brought into alignment with the plane of the reference data of the ball centres and in addition the spacings between reference and actual data of the ball centres are then minimised in this plane, the middle one in the centre of the coordinate system of the scanner being used for this minimisation. In the case of this central ball, the reference and actual data essentially correspond.

The deviations $\Delta X_{z\_i, s\_i}$, $\Delta y_{z\_i, s\_i}$, $\Delta z_{z\_i, s\_i}$ between reference and actual data of the ball centres are subsequently calculated and, by interpolation/extrapolation, three-dimensional first correction values of all the pixel elements of the scanner matrix are determined corresponding to lines and columns.

It has been shown that the accuracy with the calibration method corresponding to the above steps is still not entirely satisfactory so that a further calibration process is undertaken. For this purpose, the data of the point cloud photographed initially by the scanner are corrected with the help of the first correction values and again the actual values of the ball centres are determined from the corrected point cloud of the scanner, as described above. Then the line and column indices of the scanner matrix are determined in turn for these determined ball centres and the coordinate system of the reference data is orientated towards the coordinate system of the actual data, as likewise described above. Then the deviations between the reference and actual data of the ball centres are determined again and, by interpolation/extrapolation, three-dimensional second correction values of all the pixel elements of the scanner matrix are determined. By summation of the first and second correction values, there result correction matrices $\Delta x_{z, s}$, $\Delta y_{z, s}$, $\Delta z_{z, s}$, which are used in the following measurements respectively for the three-dimensional correction of the point cloud produced by the scanner.

The accuracy of the laser scanner used was improved with the help of such a calibration method at the required object distance of more than 3 m by a factor of approx. 10.

The invention claimed is:

1. A method for controlling robots for welding three-dimensional workpieces, having the following steps:
    positioning and tack-welding profiles onto a plate in order to form the workpiece to be welded,
    imaging the workpiece by means of a three-dimensional image detection system in the form of three-dimensional pixels,
    determining the geometrical data of the plate and of the profiles from the three-dimensional pixels as point cloud by segmentation of the latter, the segmentation including separating the points of the workpiece from the background, separating points of the plate from points of the profiles and separating points of different profiles from each other, by establishment of profile courses and examination of the segmented point cloud with respect to properties of the different profiles, including assigning cutouts and end cut edges,
    determining the weld seam data from the geometrical data taking into account the profile placement lines and the contact lines of profiles, and
    assigning the weld seam data to parameterisable specifications for the welding plan to stored predefined movement patterns of the robot and also to commands for controlling and regulating the welding process.

2. The method according to claim 1, wherein the image of the workpiece is detected by means of a 3D laser scanner.

3. The method according to claim 1, wherein the image of the workpiece is detected by means of a projection of patterns and at least one camera with assigned evaluation.

4. The method according to claim 1, wherein the determination of the geometrical data is effected by 3D processing.

5. The method according to claim 1, wherein the plate is disposed on a work table, the position of the plate plane being determined during determination of the geometrical data and the measuring points of the workpiece being transformed into a local workpiece coordinate system, the x-y plane of which coincides with the plane of the plate.

6. The method according to claim 1, wherein the pixels of the plate plane and the pixels of the profiles are separated using height coordinates.

7. The method according to claim 6 wherein the contours of the plate are determined in order to delimit workpiece and background.

8. The method according to claim 6, wherein the pixels of the profiles are pre-sorted according to coherent structures.

9. The method according to claim 8, wherein linear profile courses are determined from the pixels of the coherent structures.

10. The method according to claim 9, wherein the profile placement lines and the contact lines of profiles are determined from the linear profile courses and also from the position of the plate plane.

11. The method according to claim 1, wherein the image detection system is calibrated comprising:
   a) disposing reference balls in a plane with respect to the workpiece to be welded later, the reference values of the centres of the reference balls in an arbitrary coordinate system and at least one parameter for controlling the calibration method being prescribed,
   b) producing a point cloud of the reference balls with the image detection system and determining the actual values of the ball centres in the coordinate system assigned to the actual values,
   c) orientating the coordinate system of the reference values to the coordinate system of the actual values,
   d) calculating the three-dimensional deviations between the reference and actual values of the ball centres, and
   e) determining three-dimensional first correction values for coordinates of the image detection region by interpolation/extrapolation.

12. The method according to claim 11, wherein the point cloud photographed in step b) is corrected with the help of the first correction values and corrected actual values of the ball centres are determined, steps c) and d) are repeated and three-dimensional second correction values for the coordinates of the image detection system are determined by interpolation/extrapolation, the sum of the first and second correction values being formed in order to determine three-dimensional correction values for the image detection system.

13. The method according to claim 11, the image detection system comprising a laser scanner with a scanner matrix as image detection sensor, wherein line and column indices of the scanner matrix which are associated with the determined ball centres are determined between steps b) and c) and in that the three-dimensional first correction values are determined for all pixel elements of the scanner matrix.

14. The method according to claim 11, wherein in order to determine the second correction values, also the step of determining the column and line indices of the scanner matrix which are associated with the corrected actual values of the ball centres is repeated and in that three-dimensional correction matrices are formed for the scanner from the sum of the first and second correction values.

15. The method according to claim 11, wherein the actual values of the ball centres are determined by dividing the point cloud into individual partial point clouds, determining the coordinates of the surface points and calculating the centres of the individual balls with the help of the method of the smallest error squares.

16. The method according to claim 11, wherein the orientation according to step d) is implemented by orientating via the plane spanned by the ball centres and, in this plane, an orientation is undertaken by minimising the spacings between reference and actual values of the ball centres and also via a central ball placed in the centre of the coordinate system of the actual values.

17. A device for controlling robots for welding three-dimensional workpieces, comprising:
   an image detection system for detecting a three-dimensional image of a workpiece to be welded which has profiles tack-welded onto a plate, and for delivering image data as pixels,
   a geometry recognition module for determining the geometrical data of the plate and of the profiles from the three-dimensional pixels as point cloud by segmentation of the latter, the segmentation including separating the points of the workpiece from the background, separating points of the plate from points of the profiles and separating points of different profiles from each other, by establishment of profile courses and examination of the segmented point cloud with respect to properties of the different profiles, including assigning cutouts and end cut edges, and for determining the weld seam data from the geometrical data taking into account the profile placement lines and the contact lines of profiles, and
   a control device which contains a control algorithm for assigning the weld seam data to parameterisable specifications for the welding plan, to stored predefined movement patterns of the robot and also to commands for controlling/regulating the welding process.

18. The device according to claim 17, wherein the image detection system has a 3D laser scanner which delivers a spatial digital model of the workpiece to be welded from several individual photographs.

19. The method according to claim 17, wherein a calibration module for geometrical correlation of the coordinate systems of the robot, the image detection system and the workpiece to be welded is provided.

20. The method according to claim 18, wherein the calibration module contains a calibration algorithm wherein the profile placement lines and the contact lines of profiles are determined from the linear profile courses and also from the position of the plate plane.

21. A method for controlling robots for welding three-dimensional workpieces, having the following steps:
   positioning and tack-welding profiles onto a plate in order to form the workpiece to be welded,
   imaging the workpiece by means of a three-dimensional image detection system in the form of three-dimensional pixels,
   determining the geometrical data of the plate and of the profiles including assigning cutouts and end cut edges from the three-dimensional pixels,
   determining the weld seam data from the geometrical data taking into account the profile placement lines and the contact lines of profiles, and
   assigning the weld seam data to parameterisable specifications for the welding plan to stored predefined movement patterns of the robot and also to commands for controlling and regulating the welding process,
   wherein the pixels of the plate plane and the pixels of the profiles are separated using height coordinates, and the pixels of the profiles are pre-sorted according to coherent structures.

22. A method for controlling robots for welding three-dimensional workpieces, having the following steps:
   positioning and tack-welding profiles onto a plate in order to form the workpiece to be welded,
   imaging the workpiece by means of a three-dimensional image detection system in the form of three-dimensional pixels, determining the geometrical data of the plate and of the profiles including assigning cutouts and end cut edges from the three-dimensional pixels, determining the weld seam data from the geometrical data taking into account the profile placement lines and the contact lines of profiles, and assigning the weld seam data to parameterisable specifications for the welding plan to stored predefined movement patterns of the robot and also to commands for controlling and regulating the welding process, wherein the image detection system is calibrated comprising:

a) disposing reference balls in a plane with respect to the workpiece to be welded later, the reference values of the centres of the reference balls in an arbitrary coordinate system and at least one parameter for controlling the calibration method being prescribed, b) producing a point cloud of the reference balls with the image detection system and determining the actual values of the ball centres in the coordinate system assigned to the actual values, c) orientating the coordinate system of the reference values to the coordinate system of the actual values, d) calculating the three-dimensional deviations between the reference and actual values of the ball centres, and e) determining three-dimensional first correction values for coordinates of the image detection region by interpolation/extrapolation.

* * * * *